United States Patent Office 3,481,764
Patented Dec. 2, 1969

3,481,764
METHOD FOR PRODUCING COATED PAPERS
Kohjiro Matsumoto and Hisao Usami, Takarazuki-shi, Hyogo-ken, and Sadao Sekiguchi, Neyagawa-shi, Osaka-fu, Japan, assignors to Sumitomo Naugatuck Company, Ltd., Osaka, Japan, a corporation of Japan
No Drawing. Filed Apr. 13, 1966, Ser. No. 542,221
Claims priority, application Japan, Apr. 22, 1965, 40/24,076
Int. Cl. B44d 1/44
U.S. Cl. 117—62.2
5 Claims

ABSTRACT OF THE DISCLOSURE

This invention deals with the improvement, in the art of producing coated papers wherein the paper is treated with polyvinyl alcohol, dried and subsequently calendered, which consists in rendering such dried coated papers water-resistant by contacting same with an aqueous solution containing at least 0.01% of borax during the calendering operation.

---

This invention relates to an improved method for producing coated papers, which aims, in applying pigment coatings to papers using polyvinyl alcohol as a pigment binder, to solve the question of water resistance during the coating process as well as to improve the water resistance of papers as printing papers.

Polyvinyl alcohol is a known substance as a binder for pigment-coated papers and displays excellent adhesion when used alone or in combination with other adhesives, e.g., thermoplastic polymers in aqueous emulsions, such as known pigment binders like styrene-butadiene copolymer latexes; styrene-butadiene ternary or quaternary copolymer latexes containing a reactive third or fourth component, such as acrylamide or methacrylamide or their derivatives, or vinyl monomers containing carboxyl groups; or copolymer latexes of acrylic esters or methacrylic esters with or without other vinyl monomers; or with water-soluble, high molecular weight substances which are viscosity modifiers and at the same time adhesives, such as carboxymethyl cellulose, hydroxyethyl cellulose, alginate or polyacrylate or polymers of acrylamide, methacrylamide, and their derivatives and partial saponification products. However, since polyvinyl alcohol is a water soluble high molecular weight substance, it does not give coated papers excellent water resistance unless it is subjected to some water-insolubilizing treatment such as cross-linking. For the above purpose, there have been used, in general, water-resistance-imparting chemicals such as Formalin, melamine-formaldehyde resin, urea-formaldehyde resin, phenol-formaldehyde resin or glyoxal. These agents, however, display their efficiency only when the coated papers are subjected to sufficient heat treatment or are left at room temperature for several days to several weeks, and it is quite difficult to attain sufficient water resistance through heating during drying in the ordinary commercial production of coated papers. Therefore, not only in the case of coated papers in which such water resistance-imparting agents as mentioned above are used, but also in the case of those in which no such agents are used, the coated layers have no water resistance immediately after the drying process. Consequently, in the calendering process, polyvinyl alcohol present in the coated layer is dissolved by calender box water and subsequently the coated layer is peeled off to cause such problems as staining of rolls and the like. Even when protein, such as casein, or soybean protein is used as a binder, sufficient water resistance has not been attained before the calendering process. Therefore, an aqueous solution of salts such as those of zinc or aluminum, or other salts having excellent coagulating action on protein, have been used to eliminate the said problems in the process as well as to impart the water resistance necessary for offset printing papers.

The object of the present invention is to provide an improvement in the production steps of coated papers, characterized in that borax, which is an excellent coagulating agent for polyvinyl alcohol, is used so that the borax can effect the same performance on the polyvinyl alcohol as salts of zinc or aluminum perform on protein.

The function of an aqueous borax solution is to make the polyvinyl alcohol insoluble in water by means of a cross-linking reaction between borax and polyvinyl alcohol, as shown below, before the polyvinyl alcohol is swollen and dissolved by water:

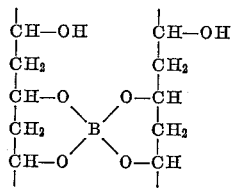

On the other hand, the aforementioned water resistance-imparting agents, e.g., melamine-formaldehyde resin, glyoxal and the like, have such actions that they react with the hydroxyl groups of polyvinyl alcohol forming covalent bonds, and the polyvinyl alcohol is cross-linked with said agents and made water insoluble. This reaction, however, is relatively slow and does not progress sufficiently in the ordinary drying steps, and consequently water insolubility is attained only when additional heating is applied or a longer time is allowed for further progress of the reaction. The slow progress of this reaction has such advantages that polyvinyl alcohol is protected from coagulating in a coating color during storage, whereby the coating color can be used without concern and the coated layer can thus be made uniformly water resistant.

On the other hand, borax reacts very rapidly with polyvinyl alcohol and, when incorporated into a coating color, it immediately brings about a coagulating reaction, which makes it difficult to be used in the same manner as the aforementioned water resistance-imparting agents. However, this also means that borax displays an excellent performance as a wetting solution in the calendering process. Thus, borax acts as a water resistance-imparting agent as well, even though it is fundamentally different in its application method from said melamine-formaldehyde resin and the like. It is the substance of the present invention to use borax as a wetting solution in the calendering process to minimize the dusting of rolls as compared with the case where ordinary water is used.

The present invention is not intended to restrict the use of such water resistance-imparting agents as the aforementioned melamine-formaldehyde resin and the like in coating colors. However, when a relatively dilute aqueous borax solution is used with a coating color containing said types of water resistance-imparting agents, the resulting offset printing paper has better water resistance. For example, when only polyvinyl alcohol is used as a pigment binder and a 0.01% aqueous borax solution is used as a wetting solution, no peeling of the coated layer is observed on the calender rolls, but, when the coated paper after the calendering step is subjected to wetting with water and rubbing, though it would show some improvement in water resistance, it may still suffer from some peeling of the coated layer. In the above case, complete water resistance can be attained if the aforesaid water resistance-imparting agents are incorporated beforehand with the coating color and the coated paper is further subjected to heat treatment or is left to dry for several days to several weeks after coating. Further, when a borax solution sufficiently high in concentration is used, it is possible to thoroughly cross link the polyvinyl alcohol thereby giving water resistance so high as not to cause any difficulty in offset printing. The concentration of the aqueous borax solution to be used ranges from at least 0.01% to less than its saturation concentration at normal or somewhat higher temperature. In the case when the concentration is less than 0.01% the resulting coated paper is poor in water resistance, and a concentration higher than said saturation concentration is not only meaningless but sometimes harmful.

In order to further clarify the mode of practice of the method, the present invention can be ilustrated, but not limited by the following examples:

Example 1

8 parts of a commercially available polyvinyl alcohol ("Kurare PVA–117," produced by Kurashiki Rayon K.K.) was dissolved, at 90° C., in 56 parts of water with stirring to form an aqueous polyvinyl alcohol solution. Separately, 80 parts of an aqueous solution containing 0.3 part of sodium pyrophosphate was added to 100 parts of a coating clay to form a slurry. The aqueous polyvinyl alcohol solution was then added to the slurry with stirring. The mixture was further incorporated with 0.5 part of sodium alginate dissolved in 10.5 parts of water. To the mixture, water was added to make the concentration of coating color 40%, whereby a coating color containing ordinary polyvinyl alcohol as an adhesive was obtained. This coating color was applied to base paper of 70 g./m.$^2$ by means of the ordinary metering bar type coater, at an application level of 15 g. m.$^2$ as dry weight of the coating color, and the paper was dried in an ordinary dryer. When the paper in the above state was wetted with water and rubbed, peeling of the coating layer was observed immediately. After drying, the paper was put through the calendering rolls. In this case, a 3% aqueous borax solution was applied in the calender box. In the case when water alone is employed, the rolls are markedly stained, whereas no such staining was observed when the 3% aqueous borax solution was used The paper put through the calendering rolls in the above manner did not show any peeling of coating layer at all, even when the coated surface was rewet with drops of water and rubbed hard with the fingers. Thus, a coated paper excellent in water resistance, surface smoothness and gloss was obtained.

Example 2

8 parts of a commercially available polyvinyl alcohol was dissolved, at 90 C., in 56 parts of water with stirring to form an aqueous polyvinyl alcohol solution. Separately, 80 parts of an aqueous solution containing 0.3 part of sodium pyrophosphate was added to 100 parts of a coating clay to prepare a slurry. The aqueous polyvinyl alcohol solution was added to the slurry, stirred and admixed. The mixture was further incorporated with 2.4 parts of a melamine-formaldehyde resin ("Sumirez Resin 613" produced by Sumitomo Chemical K.K., the same shall apply hereinafter), and then with 0.12 part of ammonium chloride dissolved in 1.08 parts of water, and the resulting mixture was thoroughly stirred and admixed. To the mixture, 0.5 part of sodium alginate dissolved in 19.5 parts of water was further added, and then water was added thereto to adjust the concentration of coating color to 40%. This coating color was applied to paper and the paper was dried in the same manner as in Example 1. The paper showed markedly low resistance against wetting and friction, like the paper in Example 1. The paper was then put through the calendering rolls using a 0.01% aqueous borax solution in the calender box. The resulting coated paper had an excellent surface smoothness and gloss, but it was not so favorable in resistance to wetting and rubbing, though it was superior in said resistance to the uncalendered paper. In the calendering step, however, no peeling of the coated layer nor staining of the rolls was observed. When the same paper was allowed to stand at room temperature for about one month, it attained a high degree of water resistance.

Example 3

4 parts of polyvinyl alcohol was dissolved, at 90° C., in 36 parts of water with stirring to form an aqueous polyvinyl alcohol solution. Separately, 80 parts of an aqueous solution containing 0.3 part of sodium pyrophosphate was added to 100 parts of a coating clay to prepare a slurry. The polyvinyl alcohol solution was added to the slurry, stirred and admixed. The mixture was further incorporated with 16 parts of a 60:40 styrene-butadiene emulsion copolymer (50% total solids) and then with 0.3 part of CMC dissolved in 19.7 parts of water, and water was added thereto to adjust the concentration of coating color to 42%. In the same manner as in Example 1, the coating color was applied to base paper and the paper was dried and subjected to calendering. No peeling of the coated layer occurred during the calendering step. By this procedure, a coated paper was obtained which was markedly excellent in printability, in gloss and in water resistance that it was judged as 0 according to the finger wet-rug test method set forth in page 602 of "Tappi," vol. 46, No. 10.

Example 4

4 parts of polyvinyl alcohol was dissolved, at 90° C., in 36 parts of water with stirring to obtain an aqueous polyvinyl alcohol solution. Separately, 80 parts of an aqueous solution containing 0.3 part of sodium pyrophosphate was added to 100 parts of a coating clay to form a slurry. The aqueous polyvinyl alcohol solution was added to the slurry, stirred and admixed. The mixture was successively incorporated with 16 parts of a modified styrene-butadiene copolymer latex ("Naugatex 2752" produced by United States Rubber Co., water content: 52%) and 1.5 parts of a melamine-formaldehyde resin ("Sumirez Resin 613," water content: 20%) and it was thoroughly stirred and admixed. To the mixture, 0.06 part of ammonium chloride dissolved in 1.14 parts of water and then 0.2 part of sodium alginate dissolved in 0.8 parts of water were added, stirred and admixed. Water was then added to make the total solids of the coating color 42%. In the same manner as in Example 1, the coating color was applied to base paper and the paper was dried and subjected to calendering. In the calendering step, a 0.1% aqueous borax solution was used and no peeling of the coating layer was observed.

The value of the finger wet-rub test (the method cited in Example 4) was 4 before calendering whereas the judgment immediately after calendering produced the value of 1. However, when a 0.05% aqueous borax solution was used as the wet-rub test solution, in place of water, the paper showed the value of 0 in either case. When the paper was subjected to the finger wet-rub test with water, as the test solution, one week after calendering, the test produced the value 0.

In the above manner a coated paper showing excellent water resistance at the time of printing and having good gloss and printability was obtained without causing any trouble in the production process due to insufficient water resistance.

Having thus described out invention, what we claim and desire to protect by Letters Patent is:

1. In a method for producing coated paper wherein an aqueous coating composition comprising a pigment and polyvinyl alcohol as a pigment binder is applied as a coating on the paper, the coated paper is thereafter dried and subsequently subjected to a calendering operation in which the coated paper is wetted with water, the improvement comprising providing, in the water with which the coated paper is wetted in said calendering operation, at least 0.01% of borax, whereby the polyvinyl alcohol coating becomes sufficiently waterproof to resist peeling of said coating and to minimize dusting of the calender rolls during said calendering.

2. The process of claim 1 wherein said water with which the coated paper is wetted during the calendering operation contains 0.05% to saturation at normal temperatures of borax.

3. The process of claim 1 wherein the polyvinyl alcohol is admixed with a thermoplastic polymer in aqueous emulsion.

4. The process ef claim 3, wherein said thermoplastic polymer is a melamine-formaldehyde resin.

5. The process of claim 3 wherein said thermoplastic polymer is styrene-butadiene emulsion copolymer.

References Cited

UNITED STATES PATENTS

| | | | |
|---|---|---|---|
| 1,625,672 | 4/1927 | Moreton | 117—62.1 |
| 2,043,324 | 6/1936 | Hubbard | 117—62.2 |
| 2,474,292 | 6/1949 | Weidner et al. | 117—155 X |
| 2,487,448 | 11/1949 | Kingerley. | |
| 2,919,205 | 12/1959 | Hart | 117—155 X |
| 3,035,966 | 5/1962 | Siuta | 117—155 X |
| 3,218,183 | 11/1965 | Fritzsching et al. | 117—155 X |
| 3,218,191 | 11/1965 | Domanski | 117—161 X |
| 3,223,579 | 12/1965 | Dorland et al. | 117—155 X |
| 3,303,155 | 2/1967 | Peterson et al. | 117—155 X |
| 3,365,408 | 1/1968 | Ohara | 117—155 X |

WILLIAM D. MARTIN, Primary Examiner

M. LUSIGNAN, Assistant Examiner

U.S. Cl. X.R.

117—155, 65.2